Sept. 13, 1955   G. W. BRADSHAW   2,717,585
OVERHEAD VALVE RAM AIR COOLING AND FILTERING DEVICE
Filed Oct. 1, 1954   3 Sheets-Sheet 1

*INVENTOR.*
GEORGE W. BRADSHAW,
BY
McMorrow, Berman + Davidson
ATTORNEYS.

Sept. 13, 1955 G. W. BRADSHAW 2,717,585
OVERHEAD VALVE RAM AIR COOLING AND FILTERING DEVICE
Filed Oct. 1, 1954 3 Sheets-Sheet 2
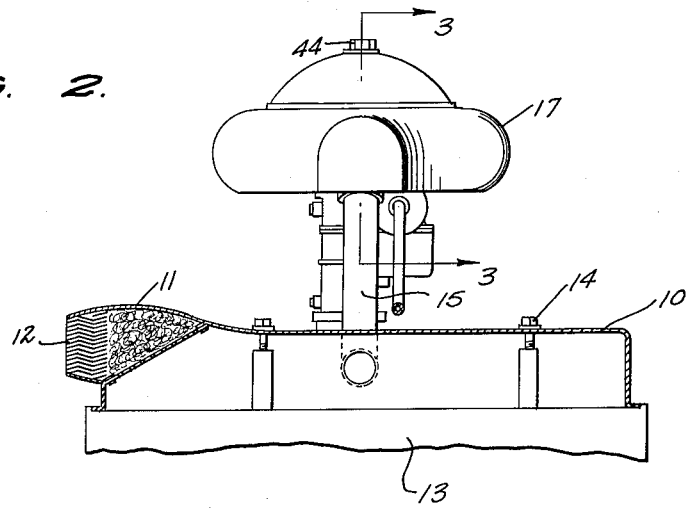
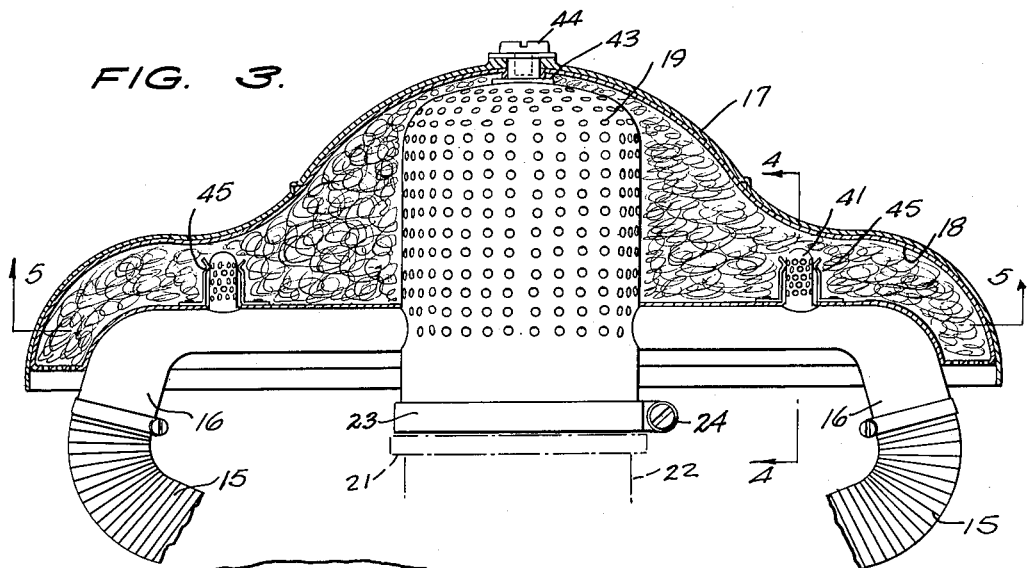
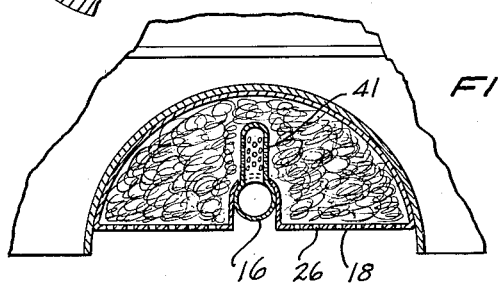
INVENTOR.
GEORGE W. BRADSHAW,
BY
McMorrow, Berman & Davidson
ATTORNEYS.

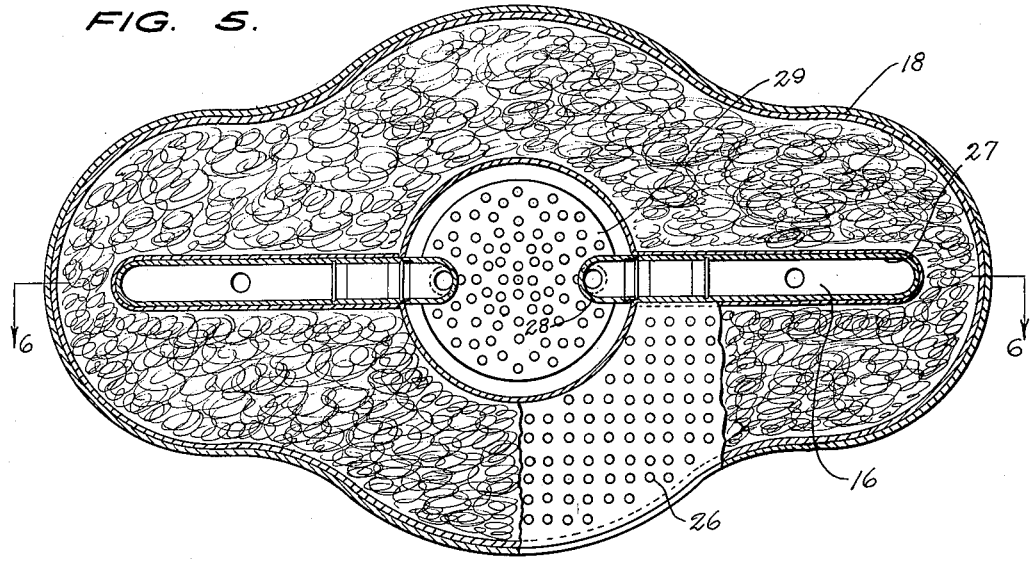
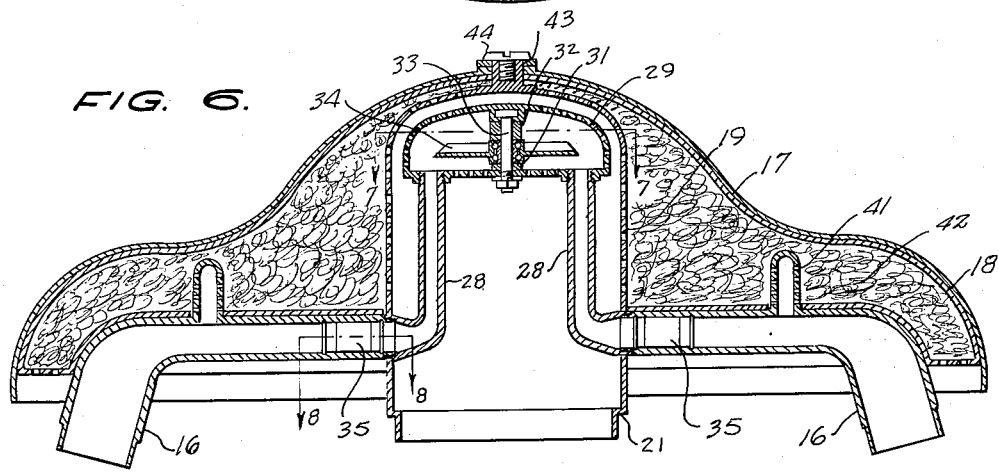
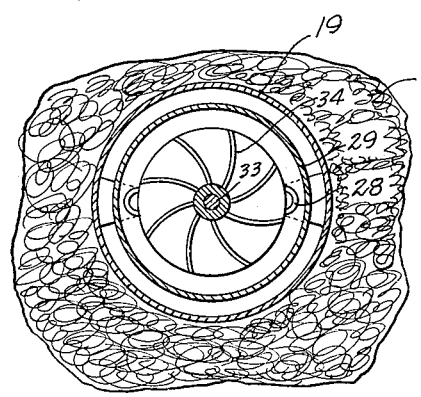

United States Patent Office 2,717,585
Patented Sept. 13, 1955

2,717,585

OVERHEAD VALVE RAM AIR COOLING AND FILTERING DEVICE

George W. Bradshaw, Detroit, Mich.

Application October 1, 1954, Serial No. 459,743

2 Claims. (Cl. 123—119)

The present invention relates to a cover and filter for overhead valves in an automotive engine for utilizing ram air to cool and ventilate the overhead valves and to filter the air drawn over the valves into the carburetor.

The principal object of the present invention is to provide a new and improved system for ventilating the overhead valves of an automotive engine of either the V-eight or in-line design.

Another object of the present invention is to provide a device which draws cool air at ram pressure from the forward end of an automotive engine into a housing over the overhead valves through a filter into a carburetor air inlet.

A further object of the present invention is to provide a housing to cover the overhead valves of an automotive engine and to use the cooling air entering the engine compartment to ventilate and cool the valves and to conduct such air along with any unburned fuel gas mixture escaping from the valve housing into the carburetor air inlet to effect economy of operation.

A still further object of the present invention is to provide a filter for the air inlet of a carburetor on a V-eight or in-line engine which has a connection to the overhead valve housing with flame-proofing material and sound-deadening material between the valve housing and the air inlet.

These and other objects of the present invention will be fully apparent from the following description when taken in connection with the annexed drawings, in which:

Figure 2 is a side view as seen on line 2—2 of Figure 1;

Figure 3 is an enlarged front view partly in cross section on line 3—3 of Figure 2;

Figure 4 is a side view partly in cross section on line 4—4 of Figure 3;

Figure 5 is a vertical view on line 5—5 of Figure 3;

Figure 6 is a side view partly in cross section on line 6—6 of Figure 5;

Figure 7 is a vertical view in cross section on line 7—7 of Figure 6;

Figure 1:
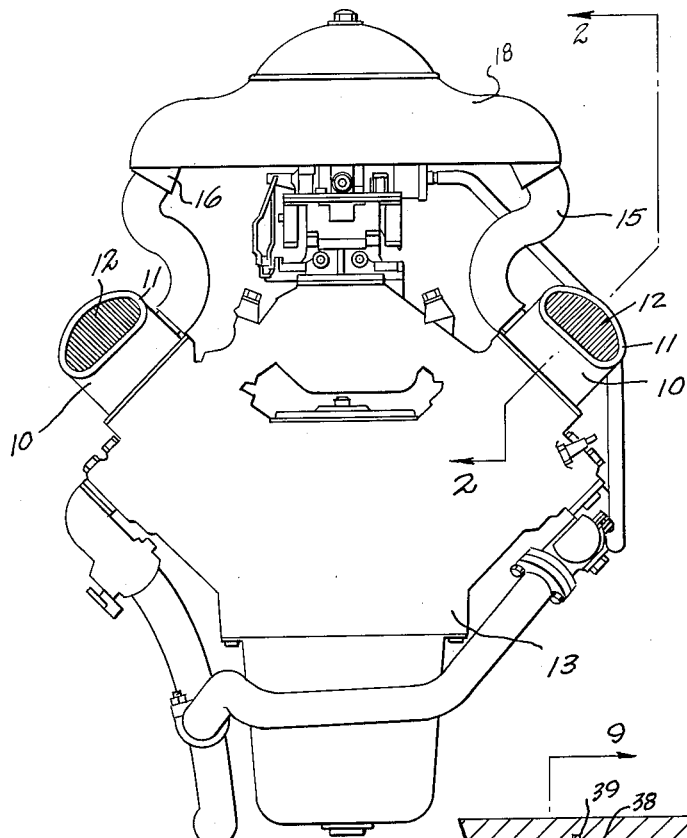
Figure 1 is a front view of a V-type engine showing the present invention in use thereon.

Referring in greater detail to the drawings, in which like reference numerals indicate like parts throughout the several views, it will be seen that the present invention consists of an elongated housing 10 having at its front end an air scoop 11 having a filter element 12 within its opening at the front end of an engine indicated generally by the reference numeral 13, as seen in Figures 1 and 2.

The housing 10 covers the overhead valve assembly of the engine 13 and is secured to the engine 13 by the conventional bolts 14.

For a V-type of engine, such as a V-eight, two housings 10 are provided each one of them connected by a flexible conduit 15 to the pipes 16 which project from the lower face of a casing 17, as seen most clearly in Figure 4.

The casing 17 is formed with an outer shell portion 18 extending around the perforated and upstanding cylindrical portion 19.

The lower end of the cylindrical portion 19 is formed with a flange 21 to seat on the upper end of the carburetor air inlet indicated in dotted lines at 22 in Figure 3.

A conventional expandable band 23 and bolt 24 detachably connects the cylindrical portion 19 to the air inlet.

The bottom 25 of the shell is provided with a plurality of holes 26, as seen best in Figure 5, and also has the elongated recesses 27 which receive the pipes 16.

Referring to Figure 6 it will be seen that the pipes 16 support on their inner ends 28 a hollow body 29 having bearing blocks 31 and 32 on lower and upper ends respectively of shaft 33 which supports the diffuser wheel indicated by the reference numeral 34.

Figure 8:
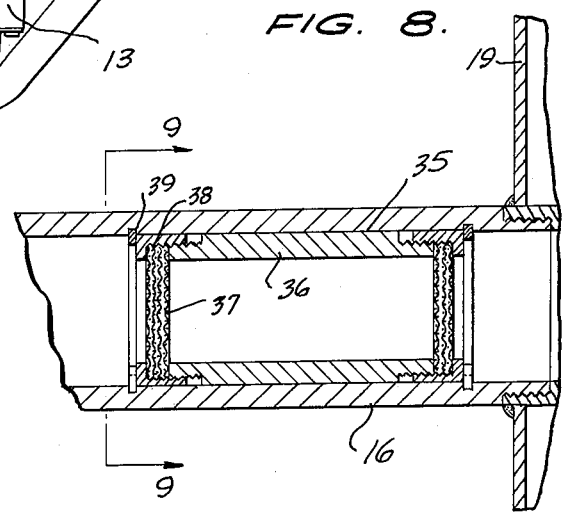
Figure 8 is a vertical view in cross section on line 8—8 of Figure 6.
Figure 9:
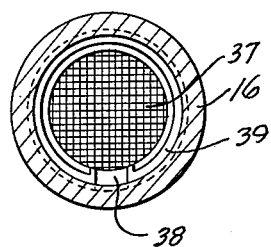
Figure 9 is an end view on line 9—9 of Figure 8.

In each of the pipes 16 is a filter unit 35 adjacent the wall of the cylindrical portion 17 as seen in Figures 8 and 9 to consist of an inner nipple 36, filter material 37 and securing rings 38 and snap rings 39 which seat in grooves in the pipes 16.

On the upper side of each of the pipes 16 and projecting into openings in the shell portion 18 are a pair of ventilating nipples 41, each of them provided with holes communicating with the interior of the shell portion 18 in which is loosely packed sound-deadening material and fire-proofing material 42.

The top end of the cylindrical portion 19 is provided with a nipple 43 having a central bore to receive the stud bolt 44 as seen best in Figures 3 and 6. In Figure 3 the shell portion 18 is seen to have a pair of clips 45 which receive each of the ventilating nipples 41 in the assembly of the present invention.

The housing 10 may be constructed of an ordinary valve cover for the particular engine in which the present invention is to be installed and welding or otherwise securing the air scoop 11 to the forward end of the housing 10. The rest of the invention is assembled by seating the flange 21 on the air inlet of the carburetor, filling the shell portion 18 with the suitable material which may be steel wool, spun glass fibers, and placing the shell portion 18 over the cylindrical portion 19. The holes 26 permit the outside air to be fed to the carburetor regardless of the gas vapors and unburned gaseous fuel coming through the flexible conduit 15 and the pipe 16 from the housing 10.

The filter units 35 are readily cleaned and replaced and when the shell portion 18 is removed from the assembly the ventilating nipples 41 are readily accessible for cleaning.

The diffuser wheel 34 serves to break up the flow of gas and air into the carburetor to afford better combustion.

The housing 10 may be altered by having an elongated metal sheet formed into an air manifold extending the length of the housing and all of the air fed to the carburetor may be received through the manifold. This modification would be used with high speed engines especially, the higher pressures of ram air entering the air scoop 11 permitting a degree of supercharging.

Further, while no materials have been here specified, it is believed that the casing 17 may be made from cast aluminum or other light weight metal, and that both the housing for the valves and the casing for the air inlet may be adapted for use with in-line engines as well as those of the V-type, and can be used on all engines having overhead valves.

While only a single embodiment has been here shown and described, other embodiments of the present invention may be made and practiced and many changes and modifications may be made within the scope of the appended claims without departing from the spirit of the invention.

What is claimed is:

1. In an automotive engine having overhead valves and a carburetor air inlet, a valve ventilating and air filtering device enclosing said valves and connected to said inlet comprising a housing connected to said engine over and enclosing said valves, said housing being formed with an opening at one end of said engine receiving ram air in conditions of movement over the ground, a casing connected to said engine and being in communication with said inlet, a flexible conduit connecting said housing to said casing and being in communication with each, filter means in said housing adjacent said opening, and filter means in said casing interposed between said conduit and said inlet.

2. In an automotive engine having overhead valves and a carburetor air inlet, a valve ventilating and air filtering device enclosing said valves and connected to said inlet comprising a housing connected to said engine over and enclosing said valves, said housing being formed with an opening at one end of said engine receiving ram air in conditions of movement over the ground, a casing connected to said engine and being in communication with said inlet, a flexible conduit connecting said housing to said casing and being in communication with each, filter means in said housing adjacent said opening, said casing being provided with openings in communication with the atmosphere, means in said casing interposed between said openings and said inlet for diffusing the air flowing therethrough, and filter means in said casing interposed between said conduit and said inlet.

References Cited in the file of this patent

UNITED STATES PATENTS

| | | |
|---|---|---|
| 1,408,179 | Du Pont | Feb. 28, 1922 |
| 1,760,272 | McCuen | May 27, 1930 |